May 5, 1953

H. T. KRAFT 2,637,345

TORQUE TRANSMITTING DEVICE EMPLOYING
EXTENSIBLE RESILIENT CLUTCH ELEMENTS

Filed Aug. 16, 1947

INVENTOR.
Herman T. Kraft
BY
Evans & McCoy
ATTORNEYS

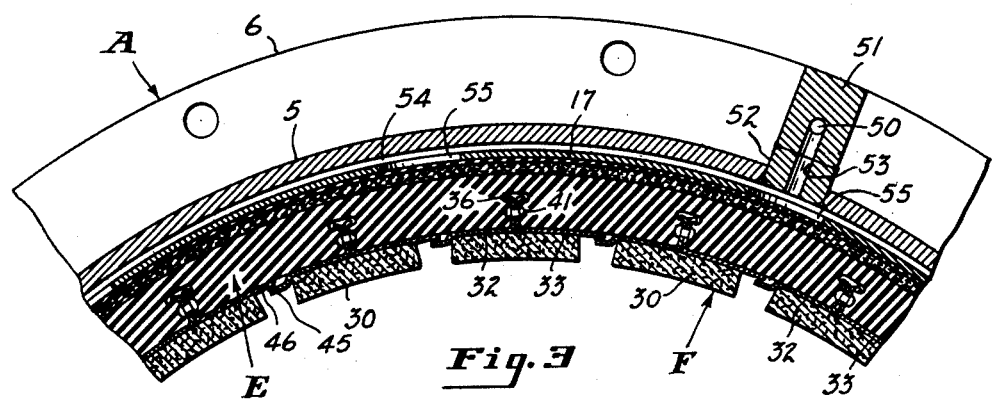
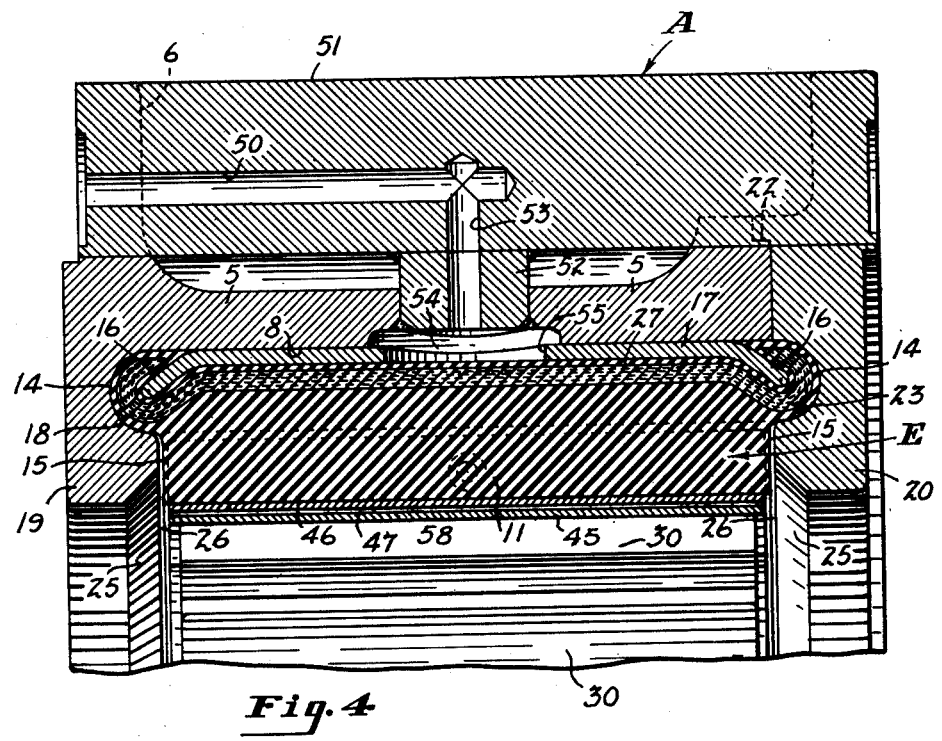
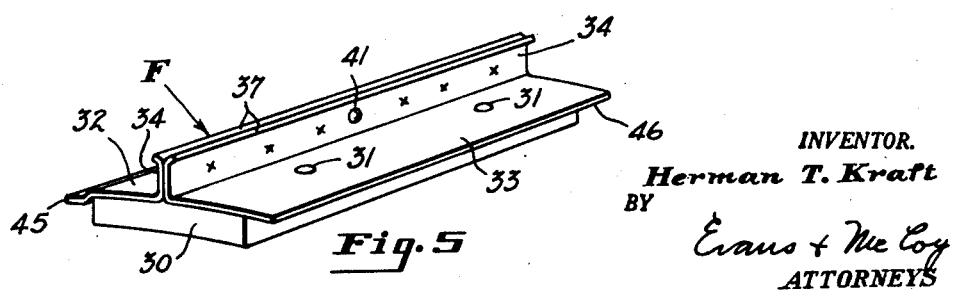
INVENTOR.
Herman T. Kraft
BY
Evans + McCoy
ATTORNEYS INVENTOR.
Herman T. Kraft
BY
Evans + McCoy
ATTORNEYS Patented May 5, 1953

2,637,345

UNITED STATES PATENT OFFICE 2,637,345

TORQUE TRANSMITTING DEVICE EMPLOYING EXTENSIBLE RESILIENT CLUTCH ELEMENTS

Herman T. Kraft, Akron, Ohio, assignor to The General Tire and Rubber Company, Akron, Ohio, a corporation of Ohio Application August 16, 1947, Serial No. 769,059

27 Claims. (Cl. 137—784)

This invention relates to torque transmitting devices, more particularly to such devices employing circumferentially extending, resilient, deformable elements that carry the torque load.

The principal objects of the present invention are: to provide a generally improved cushioning torque transmitting device suitable for use primarily as a driving clutch but also embodying principles and features of construction having applications in brakes and couplings; to provide, for use in a torque transmitting device, a pneumatic element of deformable character that is movable to effect a driving connection or to interrupt the driving connection between the parts of the device by the ingress or egress of a relatively small amount of fluid, more specifically to provide in combination a circumferentially extending resilient deformable rubber element and a circumferentially extending metal ring which are interlocked to cooperatively provide a fluid confining zone; to provide a circumferentially extending resilient deformable rubber element in a pneumatic assembly, the element being of such character as to be placed under compression upon the introduction of fluid under pressure into the assembly so that the compressive forces in the element aid in forcing fluid out of the pneumatic assembly; to provide, for use in torque transmitting devices, friction block assemblies in combination with a circumferentially extending resilient deformable rubber element, the friction blocks and the element being so interlocked as to be readily assembled or dis-assembled without damage or injury to the parts while, for normal use, each of the blocks is positively retained in predetermined relative position with respect to the deformable element so as effectively to resist excessive twisting, turning and circumferential displacement of the block and the element; and to provide a torque transmitting device of the type having a series of friction blocks mounted about a resilient deformable rubber annulus which includes protective means for the annulus so arranged as to avoid interference with the free actuation of the device so that making and interrupting the driving connection between the parts is effected positively, uniformly, and with the application of relatively small forces.

Further objects of the invention relate to novel features of construction and arrangements of parts providing simplicity in design and economy in manufacture as well as facilitating servicing and repairing of the device and the replacing of worn and broken parts. Additional objects and advantages will become apparent from the following detailed description of one embodiment of the invention made in connection with the accompanying drawings forming a part of the present specification.

In the drawings:

Fig. 3 is a fragmentary sectional view through the outer annular member of the device, parts being broken away and removed, this view being taken in a plane transverse to the rotational axis of the device, the parts being slightly enlarged with respect to Fig. 1;

Fig. 4 is a radial sectional detail through the outer rotatable member, with parts removed, this view being taken substantially along the line indicated at 4—4 of Fig. 1 and enlarged with respect to that figure;

Fig. 5 is a perspective view of one of the friction block assemblies;

Figure 1:
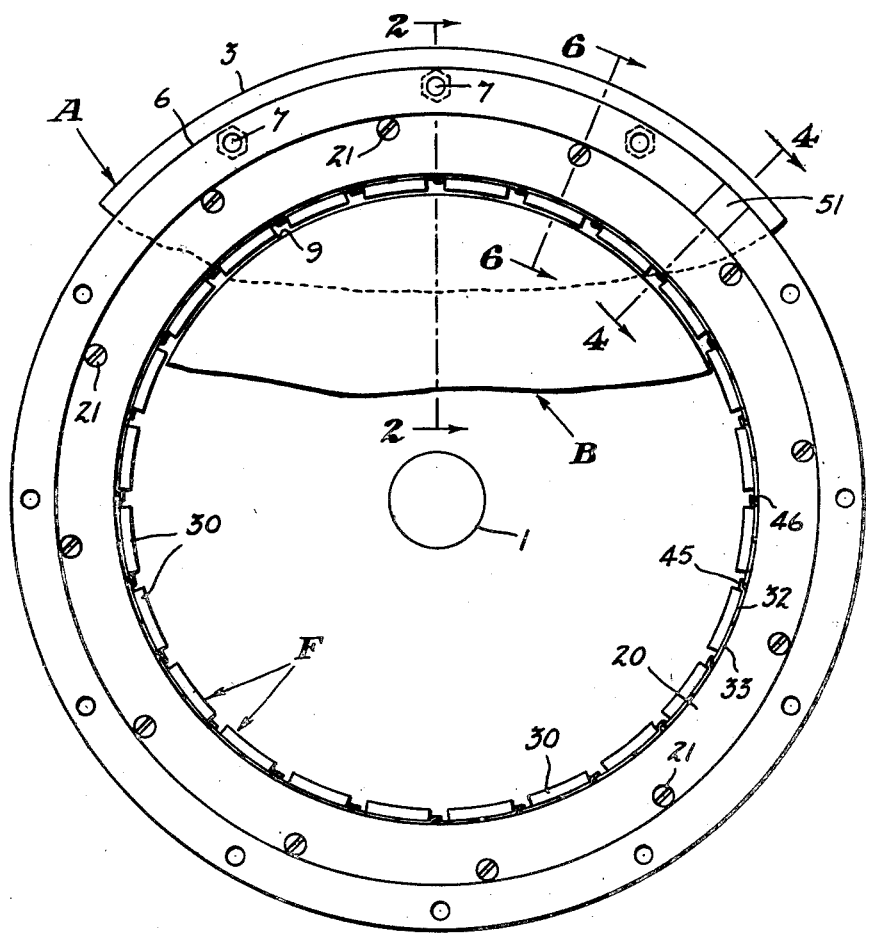
Figure 1 is an elevational view of the torque transmitting device partly in section and with parts broken away and removed.

The principles of the present invention are embodied in a torque transmitting device intended for use as a driving clutch which couples a pair of axially aligned shafts. The present clutch has such flexibility as to permit substantial misalignment of the shafts both laterally and angularly. Axial shifting of the shafts is also permitted to a limited extent, severe axial displacement of one of the shafts with respect to the other being strongly resisted. Similar types of torque transmitting devices have previously been proposed, such designs being shown in my prior Patents No. 2,246,978, issued June 24, 1941, No. 2,252,128, issued August 12, 1941, No. 2,246,979, issued June 24, 1941, and No. 2,326,300, issued August 10, 1943. Reference is also made to copending application for Patent Serial No. 14,487, filed March 12, 1948, on Torque Transmitting Device which covers common subject matter. The present disclosure is therefore restricted to those features necessary or convenient to a complete understanding of the principles of the instant invention, it being understood that the mounting shafts to be coupled by the present device, the supports and journals for such shafts as well as the valves, conduits and glands for supplying the pneumatic fluid for actuating the device may be conventional.

The clutch comprises an outer rotatable member indicated generally by the letter A and an inner rotatable member indicated generally by the letter B. Either member may be the driving member and either member may be the driven member depending on the particular application of the device. The members are mounted on axially aligned shafts, one of which is indicated at 1, Fig. 1.

The outer member A comprises a circular cast or forged metal disk 2 which may be of relatively heavy section to serve as a fly wheel, the disk having a thickened peripheral rim 3. Mounted against one face of the disk rim 3 and interfitting with an indexing shoulder 4 thereof is a circular drum 5, also of metal, which has an outwardly directed radial flange 6 disposed flatwise against the disk rim 3 and secured thereto by through bolts 7. The outer drum 5 is formed with an inwardly directed cylindrical face 8 which surrounds and is disposed in confronting relation to an outwardly directed cylindrical friction face 9 formed on cast or forged metal drum portion 10 of the inner rotatable member B. Interposed in the annular space between the inwardly directed face 8 on the outer rotatable member and the outwardly directed friction face 9 of the inner rotatable member is a circumferentially extending resilient deformable element E mounting a series of friction block assemblies F.

The element E is preferably completely annular in extent and is included in a pneumatic assembly which can be inflated to move the friction blocks F into engagement with the friction face 9 of the inner rotatable member so as to establish driving connection between the parts.

The annulus or element E is of molded rubber composition having a stiffness corresponding to that used in conventional tires for passenger automobiles. Body portion 11 is of solid rubber and is of relatively greater axial width than radial thickness, the width being preferably several times the thickness such as at least 3 times as wide as thick and as much as 4 or more times as wide being desirable.

Integral rubber edge flanges or beads 14 are formed along the opposite edges of the body portion, extending beyond the plane of side walls 15 thereof and being continuous about the entire circumferential extent of the body. The edge flanges 14 are formed into U-shaped reverse bends about edge flanges 16 of a cylindrical metal ring 17 received by a sliding fit within the inner face 8 of the outer drum 5. The edge flanges 16 of the ring are bent or formed to extend inwardly from the surface of the cylindrical ring 17 being disposed at an obtuse angle with respect to the latter and forming a concave retaining means for receiving, within its concavity, the body of the deformable annulus E, and the edge flanges 16 of the ring are wholly embraced by the body 11 and rubber flanges 14 of the deformable annulus.

The body portion 11 of the resilient rubber element is narrower than the overall width of the cylindrical metal ring 17 including the flanges of the latter. However, the side walls 15 of the rubber element are disposed in planes intersecting the angularly disposed edge flanges 16 of the metal ring. To retain the resilient annulus or element E assembled to the metal ring 17 and the other parts of the outer rotatable member, and so as to maintain a fluid tight seal between the rubber flanges 14 and the angularly disposed edge flanges 16 of the ring, the U-shaped curved portions of the rubber flanges 14 are embraced throughout at least the major portions of their extent. One of the flanges is received in a circumferentially extending undercut recess 18 which is of approximately semi-circular cross section and is formed by an undercut in the side of a radially inwardly extending flange 19 of the outer drum 5. The other rubber flange 14 is received in a circumferential, semi-circular groove 23 formed in a retaining ring 20, the groove 23 matching the groove 18 in curvature and the retaining ring 20 being secured to the outer drum 5 by a series of circumferentially spaced cap screws 21, the ring and the outer drum having inter-engaging circumferentially extending indexing shoulders indicated at 22. The drum 5 with its radial flange 19 and the attached retaining ring 20 thus define an inwardly directed channel having undercut side walls forming the circumferentially extending recesses 18 and 23.

The radial flange 19 and the retaining ring 20 extend radially inward over the side walls 15 of the resilient element E. However, the inner corners of the flange and retaining ring are beveled as indicated at 25 and the inner faces of the flange and the retaining ring are spaced from the side walls 15, providing circumferentially extending clearances 26 around the entire extent of the element. Thus the rubber element is secured in place by the grip of the undercut recessed flange 19 and the correspondingly shaped retaining ring 20 which clamp the reversely bent U-shaped flanges 14 of the element E against the obtusely angled edge portions or flanges 16 of the metal locating ring 17.

The body portion 11 of the resilient deformable element is free for limited displacement or movement axially, circumferentially and radially, subject to the internal resistance of the same to deformation and subject also to the physical limitations against excessive axial displacement afforded by the radially inwardly projecting portions of the flange 19 and the retaining ring 20 which are disposed to bear against the side walls 15 of the rubber element E upon severe axial loading to limit the axial movement of the latter.

While the rubber flanges 14 may be mounted or formed so as to project axially straight out from the sides of the deformable annulus they preferably are molded substantially to the final shape shown in the drawings, the rubber being folded or formed about a molding ring corresponding in shape to the ring 17 and held in said shape, as in a heated metal mold, during the molding or vulcanizing operation. Desirably the mold ring used in curing the annulus E is slightly thinner than the ring 17 so that the flange receiving grooves molded into the flange portions of the annulus are narrower than shown in the final assembly and in the assembly of the pneumatic device the obtusely angled flanges 16 of the metal or steel locating and sealing ring are tightly gripped, partly by the inherent resiliency of the rubber material of which the flanges 14 are made. The gripping of the flanges of the locating or spreading and sealing ring 17 by the rubber flanges also facilitates assembly of the pneumatic unit, the deformable annulus or element E being assembled on the ring 17 apart from the other pieces of the rotatable member A. The assembled unit is then moved axially into position within the outer drum 5.

The U-shaped flanges 14 are molded to a thickness slightly in excess of that shown in the drawings so that during assembly they are tightly compressed and sealingly clamped in place and the body portion 11 of the annulus or element is under slight axial compression.

Imbedded in the body of the rubber annulus closely adjacent the positioning ring 17 are a series of reinforcing cords indicated at 27. These cords are arranged in parallel relation to one another and to the rotational axis of the outer rotatable member and may be said to be axially disposed. The cords extend across the entire width of the element E and are continuous into and substantially throughout the extent of the integral rubber flanges 14. The opposite ends of the cords are formed into reverse bends that follow the contour of the rubber flanges 14 and embrace the edge flanges 16 of the retaining ring so as to be clamped between the retaining ring and the walls of the undercut channels 18 and 23 of the metal parts of the outer rotatable member. By reason of the inward bends in the edge portions of the retaining ring 17 to form the obtusely angled flanges 16 a large percentage of the body portion 11 of the rubber annulus is disposed radially outwardly of the extreme inner edges of the ring flanges 16, or may be said to be located "between" such flanges. The locating and sealing ring 17 is thus channel or somewhat U-shaped in cross section and is marginally embraced by the resilient rubber annulus. That portion of the rubber annulus which contains the reinforcing cords 27 is thus disposed radially outwardly of the edges of the ring flanges 16 so that the major portion of the cords may also be said to be confined between such flanges. The end portions of the reinforcing cords in following the contours of the ring 17 are somewhat S shape in configuration and are separated from the metal of the retaining ring 17 by only a thin coating of rubber, the great bulk of the rubber of the deformable annulus or element E lying radially inward of the cords between the latter and the friction face of the internal rotatable member B.

Each of the friction block assemblies F includes a wear resistant contact or body member 30 which is preferably of molded composition corresponding to that used in conventional brakes of automotive vehicles. This body portion is of rectangular shape and is secured by rivets 31 to a pair of metal mounting plates 32 and 33. These plates are of tough rolled metal such as steel and have flange portions 34 angularly disposed in back to back relation and spot-welded together. The flange portions 34 of the mounting plates constitute an attaching flange which is received in a transverse slot or groove 35 formed in the body portion 11 of the rubber annulus or element E, the main portions of the mounting plates being disposed flatwise against inner pressure face 58 of the rubber annulus which is wider than the mounting plates and extends axially beyond the edges of such plates. The bottom of each of the grooves 35 is enlarged, providing undercut recesses 36 which receive oppositely bent or rolled edges 37 formed on the plate flanges 34. The molding of the transverse grooves 35 is effected by mold parts thinner than the retaining flanges of the friction blocks F so that such retaining flanges are embraced or gripped between the confronting walls of the rubber channels 35. The undercut recesses 36 along the bottoms of the transverse grooves 36 are larger than the rolled over-edges 37 of the plate flanges to permit slight working movement without chafing.

In the central portion of each of the transverse grooves 35 the walls of the latter are formed with hemispherical recesses 40 that receive the rounded ends of a rivet or detent 41 secured through the plate flanges 34. The seating of the ends of the rivets 41 in the recesses 40 locates the friction blocks by detent and socket action in correct relative position transversely of the deformable annulus E. During assembly each of the friction blocks F, previously assembled as a unit, is slid axially into position, the retaining flanges of the plates 32 and 33 moving axially into the grooves 35 until the flange rivets or detents 41 register with and are received in the groove recesses 40. During this assembly operation the walls of the grooves 35 are locally deformed by the movement of the rivets 41, this slight deformation not being injurious.

The edges of the mounting plates 32 and 33 extend circumferentially beyond the body portions 30 of the friction blocks, the plates 32 each having an offset flange portion 45 which is thus held away from the pressure face of the annulus and overlaps an edge portion 46 of the plate 33 of the adjacent friction block unit. The offset of the flange portion 45 is greater than the thickness of the metal out of which the mounting plates are formed so as to provide a clearance 47 between the flange and the companion plate edge portion 46. This clearance between the overlapped edges of the mounting plates is extremely advantageous for the reason that it permits relative circumferential movement of the adjacent friction blocks toward and away from one another during engagement and disengagement of the clutch.

The composition body portions 30 of adjacent friction block assemblies are spaced from one another and during the starting engagement of a clutch of the type herein disclosed, hot particles are apt to move into such spaces between the friction blocks. The overlapped portions 45 and 46 of the mounting plates serve as protection for the rubber element or annulus E against such hot particles and other foreign matter that might otherwise come in contact with the rubber body 11.

Figure 2:
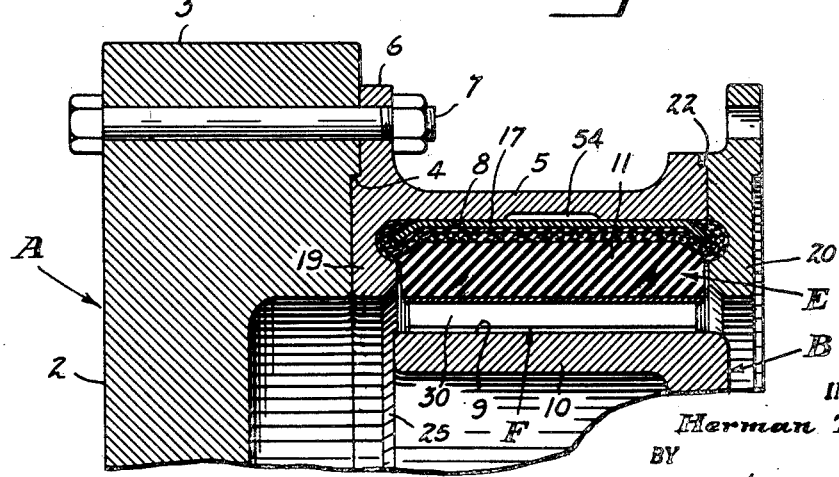
Fig. 2 is a sectional detail taken substantially on the line 2—2 of Fig. 1 and enlarged with respect to that figure.

In the normal unstressed position of the resilient deformable annulus or element E the friction block assemblies F are held in retracted position out of engagement with friction surface 9 of the inner rotatable member B (Figs. 1 and 2). When it is desired to establish a driving connection between the rotatable members A and B, fluid such as air, is introduced into the pneumatic device to deform the resilient annulus E in such manner as to move the friction blocks F against the surface 9. The air or pneumatic fluid to effect inflation is provided from a suitable source, not shown, and is conducted (as through an axial bore in the shaft mounting the outer rotatable member) into a radial passage in the disk 2 which communicates at the periphery of the outer rotatable member with a passage 50 formed in an axial element 51 welded in the retaining flange 6. A connector 52 is welded into a circular radially disposed opening in the drum 5 and is formed with a passage 53 which communicates with the passage 50.

Figure 6:
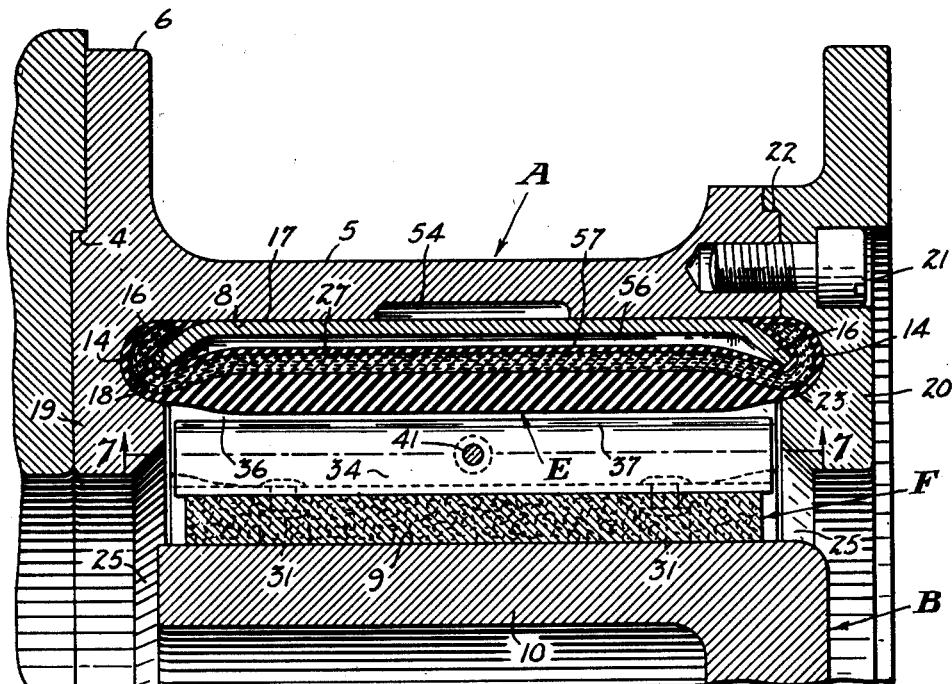
Fig. 6 is a radial sectional detail, with parts broken away and removed, taken substantially along the line indicated at 6—6 of Fig. 1 and enlarged with respect to that figure, this view showing the device with the pneumatic assembly inflated to establish a driving connection between the parts.
Figure 7:
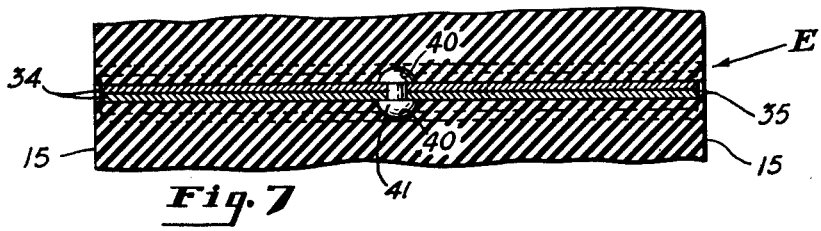
Fig. 7 is a fragmentary sectional detail taken substantially on the line indicated at 7—7 of Fig. 6 to show one of the transverse slots or grooves provided in the rubber annulus for receiving and retaining in interlocking relation the flange of one of the friction blocks.
Figure 8:
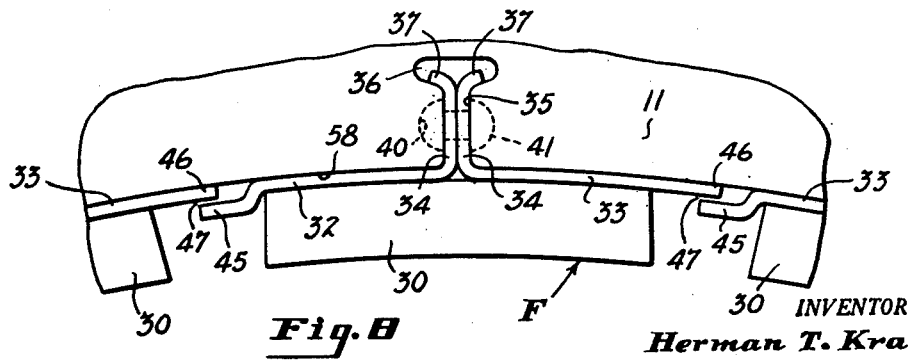
Fig. 8 is an enlarged fragmentary elevational detail with parts broken away and removed, showing the interlocking connection between the deformable rubber annulus and one of the individual brake blocks which holds the parts in assembled relation.

The inner end of the passage 53 communicates with a circumferentially extending channel or recess 54 formed in the inner face 8 of the drum 5. The recess 54 thus provides a passage extending around the entire circumferential extent of the metal ring 17, the latter being formed with a series of spaced openings 55 through which pneumatic fluid may be forced into the zone between the metal ring 17 and the deformable rubber element or annulus E. This pneumatic zone is of little or no volume when the rubber annulus is retracted or in its normal unstressed condition as shown in Figs. 1, 2 and 4. Upon the introduction of air or other fluid into the zone between the metal ring and the rubber annulus, as through the passages mentioned, the rubber annulus is forced away from the face of the ring moving the friction blocks F radially inward into engagement with the friction face 9 of the inner rotatable member thereby establishing a driving connection between the parts (Fig. 6). In this movement of the resilient annulus E the body portion 11 thereof is further axially compressed by reason of the "straightening out" of inner face 57 of the annulus which moves away from the metal ring 17 providing a clearance 56 which receives and contains the pneumatic fluid. The severest compression or stress in the deformable rubber annulus occurs in that portion thereof normally lying against or closely adjacent the metal ring 17 and which contains the reinforcing cords 27, the latter are thus also compressed when the clutch is "energized" or inflated to effect a driving connection between the rotatable members.

During driving operation the fluid pressure within the pneumatic device holds or forces the friction blocks F strongly against the cylindrical face 9 of the inner rotatable member. A corresponding radial force acts between the flat faces of the mounting plates 32 and 33 of the friction blocks and the pressure face 58 of the rubber element E which underlies the mounting plates. The interlocking connections between the individual friction blocks and the rubber annulus E afforded by the attaching flanges of the blocks that are received in the grooves 35 serve to transmit some of the driving torque, especially during engaging and disengaging operations, and resist twisting and turning as well as circumferential displacement of the friction blocks on the annulus. Torque is transmitted to a very great degree by frictional engagement between the mounting plates 32 and 33 and the friction or pressure face 58 of the resilient deformable annulus.

Should the friction blocks become worn or damaged so that it is desirable to replace one or more, they can be readily removed by withdrawing them axially from assembled relation in the annulus E, the retaining ring 20 being first removed from the outer rotatable member. This replacement of the friction blocks F is effected without injury or damage to either the annulus or element E or the blocks and without the use of special tools or equipment. After removal of the retaining ring 20 the blocks F can be individually removed, only enough force being required to overcome the detaining force of the ends of the rivet 41 in the rubber sockets or recesses 40 and the slight frictional grip of the groove walls 35 on the opposite side faces of the block retaining flanges.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A fluid motor for use in a torque transmitting device, said motor comprising a rigid member, an arcuate element carried by said rigid member, said arcuate element being substantially channel shaped in cross section and having a curved body portion and spaced curved flanges each inclined to the body portion, a resilient deformable element normally positioned in the space between the flanges of the arcuate element, said resilient element being curved concentrically to the arcuate element and having integral side portions embracing said flanges of the arcuate element, the deformable element normally, in its unstressed condition, extending radially into the space between the spaced flanges of the arcuate element and seating against the body portion of the arcuate element, and means for introducing a fluid under pressure between the arcuate element and the deformable element to displace the latter from said normal position.

2. A fluid motor for use in a torque transmitting device, said motor comprising a rigid member, an arcuate element carried by said rigid member, said arcuate element being substantially channel shaped in cross section and having a curved body portion and spaced curved flanges along the edges of the curved body portion, said curved flanges each being disposed at an obtuse angle to the body portion of the arcuate element and being in divergent relation with respect to one another, a resilient deformable element normally positioned in the space between the flanges of the arcuate element, said resilient element being curved concentrically to the arcuate element and having integral side portions embracing said flanges of the arcuate element, the deformable element normally, in its unstressed condition, extending radially into the space between the spaced flanges of the arcuate element and seating against the body portion of the arcuate element, and means for introducing a fluid under pressure between the arcuate element and the deformable element to displace the latter from said normal position.

3. In a torque transmitting device, a rigid member formed with a circular channel, the channel having undercut side walls providing circumferentially extending recesses, a substantially circular ring disposed in the channel and having spaced substantially circular edges extending into the circumferential recesses in the side walls of the channel, a resilient deformable element disposed in the channel, said element having integral portions along its sides extending laterally into the side wall recesses and embracing the edges of the ring, and means for introducing a fluid under pressure between the deformable element and the cylindrical ring.

4. In a torque transmitting device, a rigid member formed with a circular channel, the channel having undercut side walls providing circumferentially extending recesses, a substantially circular ring disposed in the channel and having spaced substantially circular edges extending into the circumferential recesses in the side walls of the channel, a resilient deformable element disposed in the channel, said element having integral portions along its sides extending laterally into the side wall recesses and embracing the edges of the ring, reinforcing cords embedded in the deformable element and the laterally extending side portions thereof, said cords being continuous into the channel wall recesses and around the edges of the ring, and means for introducing a fluid under pressure between the deformable element and the cylindrical ring.

5. In a torque transmitting device, a rigid member formed with a circular channel, the channel having undercut side walls providing circumferentially extending recesses, a substantially cylindrical ring disposed in the channel and having spaced oppositely directed edges axially aligned with the recesses in the channel side walls, a resilient deformable element disposed in the channel, said element having integral portions along its sides extending laterally into the side wall recesses and embracing the edges of the ring, and means for introducing a fluid under pressure between the deformable element and the cylindrical ring.

6. In a torque transmitting device, a rigid member formed with a circular channel, the channel having undercut side walls providing circumferentially extending recesses, a substantially cylindrical ring disposed in the channel and having spaced oppositely directed edges axially aligned with the recesses in the channel side walls, a resilient deformable element disposed in the channel, said deformable element having a relatively thick sectioned central portion and relatively thin sectioned side portions, said thin side portions of the deformable element extending laterally into the side wall recesses of the channel and embracing the edges of the ring, and means for introducing a fluid under pressure between the deformable element and the cylindrical ring.

7. In a torque transmitting device, a rigid member formed with a circular channel, the channel having undercut side walls providing circumferentially extending recesses, a substantially cylindrical ring disposed in the channel and having spaced oppositely directed edges axially aligned with the recesses in the channel side walls, a resilient deformable element disposed in the channel, said deformable element having a relatively thick sectioned central portion and relatively thin sectioned side portions, said thin side portions of the deformable element extending laterally into the side wall recesses of the channel and embracing the edges of the ring, reinforcing cords embedded in the deformable element, said cords extending into the side wall recesses and around the ring edges and in the thick central portion of the deformable element being radially offset toward the ring from the median plane of the deformable element, and means for introducing a fluid under pressure between the deformable element and the cylindrical ring.

8. In a torque transmitting device, a rigid member formed with a circular channel, the channel having undercut side walls providing circumferentially extending recesses, a substantially cylindrical ring disposed in the channel of the rigid member, said ring having a pair of axially spaced angularly disposed marginal flange portions, the edges of said flange portions being axially aligned with the recesses of the channel side walls, a resilient deformable element disposed in the channel of the rigid member and between the channel side walls, said deformable element having spaced integral portions extending into the side wall recesses and disposed in embracing relation to the edge flange portions of the ring, and means for introducing a fluid under pressure between the deformable element and the cylindrical ring.

9. In a torque transmitting device, a rigid member formed with a circular channel, the channel having undercut side walls providing circumferentially extending recesses, a substantially cylindrical ring disposed in the channel of the rigid member, said ring having a pair of axially spaced angularly disposed marginal flange portions, the edges of said flange portions being axially aligned with the recesses of the channel side walls, a resilient deformable element disposed in the channel of the rigid member and having a relatively thick sectioned central portion and relatively thin sectioned side portions, said thin side portions of the deformable element extending laterally into the side wall recesses of the channel and embracing the edges of the ring, and means for introducing a fluid under pressure between the deformable element and the cylindrical ring.

10. In a torque transmitting device, a fluid motor comprising a rigid member, a retaining element carried by said member, the retaining element being curved cylindrically and having axially spaced circumferentially extending divergent flanges, each flange of the retaining element having oppositely directed substantially parallel surfaces, said retaining element defining an open channel located between the flanges, said channel being tapered radially and of substantially uniform radial depth, a resilient deformable element positioned in the open channel between the divergent flanges and having integral side portions embracing the flanges of the retaining element, means clamping said integral portions of the deformable element against some of said surfaces of the retaining element flanges, and means for introducing a fluid under pressure between the retaining element and the deformable element, the deformable element being arranged, upon such introduction of fluid between the elements, to move away from others of said surfaces of the retaining element flanges.

11. In a torque transmitting device, a fluid motor comprising a rigid member, a retaining element carried by said member, the retaining element being curved cylindrically and having axially spaced circumferentially extending divergent flanges, each flange of the retaining element oppositely directed substantially parallel surfaces, said retaining element defining an open channel located between the flanges, said channel being tapered radially and of substantially uniform radial depth, a resilient deformable element positioned in the open channel between the divergent flanges and having integral side portions embracing the flanges of the retaining element, means clamping said integral portions of the deformable element against some of said surfaces of the retaining element flanges, reinforcing elements embedded in the deformable element, said reinforcing elements being disposed generally to follow the contour of the retaining element and extending into the side portions of the deformable element and about the edges of the flanges of the retaining element to be held by the clamping means, and means for introducing a fluid under pressure between the retaining element and the deformable element, the deformable element being arranged, upon such introduction of fluid between the elements, to move away from others of said surfaces of the retaining element flanges.

12. A fluid motor for use in a torque transmitting device, said motor comprising a rigid member a resilient deformable annulus carried by said rigid member, the annulus comprising a relatively thick central body portion having substantially cylindrical inner and outer faces and relatively thin circular flanges extending laterally from the sides of the thick body portion, said flanges being connected to the sides of the thick body portion along spaced parallel circular lines each spaced radially inwardly from the outer and radially outwardly from the inner faces of the deformable annulus, said circular lines of connection each being located intermediate said inner and outer faces of the annulus, means clamping the integral flanges of the deformable element to the rigid member along circumferentially extending zones of less radius than the outer face of the deformable element, said clamping zones being located between the cylinders generated by the faces of the annulus, and means for moving the thick body portion of the deformable element radially away from said rigid member.

13. In a torque transmitting device, a fluid motor comprising a rigid circular member and a resilient deformable circular element carried by said rigid member, said fluid motor being characterized in that the rigid circular member is formed with substantially circular recesses disposed in confronting relation to one another, in that the circular deformable element is formed with integral portions extending axially into said recesses, and being further characterized in that substantially circular ring means is included in the combination, said ring means having edges aligned with the recesses, and the integral edge portions of the deformable element being disposed about the edges of the ring means to embrace the latter.

14. In a torque transmitting device, a fluid motor comprising a rigid member having an arcuate surface, an arcuate member of resilient deformable material disposed in substantially concentric relation to said surface of the rigid member, said deformable member comprising a central portion relatively thick radially and integral relatively thin marginal portions, the marginal portions each being formed with a circumferentially extending reverse bend, the marginal portions also being disposed in spaced substantially parallel relation to one another, and rigid concave retaining means secured to the rigid member, the deformable member being received within the concavity of the retaining means and the retaining means having a substantially cylindrically curved surface normally contacting the thick central portion of the deformable member, and the retaining means also including circumferentially extending flanges angularly disposed with respect to said cylindrically curved surface, said angularly disposed flanges being received within the bends of the relatively thin marginal portions of the deformable member.

15. A fluid motor for use in a torque transmitting device, said motor comprising a rigid member having an arcuate surface, an annulus of resilient deformable material carried by the rigid member in substantially concentric relation to said surface, said annulus comprising a circumferentially extending central portion relatively thick radially and integral relatively thin annular marginal portions, the marginal portions each being formed with a circumferentially extending reverse bend, the marginal portions also being disposed in spaced substantially parallel relation to one another, and rigid concave arcuate retaining means secured to the rigid member, said retaining means having a substantially cylindrically curved surface and circumferentially extending flanges angularly disposed with respect to said cylindrically curved surface, the thick portion of the annulus being received within the concavity of the retaining means and normally being substantially in contact with said cylindrically curved surface, and the angularly disposed flanges of the retaining means being received within the bends of the relatively thin marginal portions of the deformable annulus.

16. In a torque transmitting device, a rigid member having an arcuate surface, an arcuate member of resilient deformable material disposed in substantially concentric relation to the arcuate surface of the rigid member, said deformable member comprising a central portion relatively thick radially and integral relatively thin marginal portions, the marginal portions each being formed with a circumferentially extending reverse bend, the marginal portions also being disposed in spaced substantially parallel relation to one another, and a rigid circular retaining element carried by the rigid member, said retaining element having a substantially cylindrical surface and circular flanges angularly disposed with respect to the cylindrical surface in the provision of a circumferentially extending concavity in the retaining element, the thick central portion of the deformable member being received within the concavity of the retaining element and being normally substantially in contact with the cylindrical surface of such element, and the angularly disposed flanges of the retaining element being received within the bends of the relatively thin marginal portions of the deformable member.

17. A fluid motor for use in a torque transmitting device, said motor comprising a rotatable member, an annulus of resilient deformable material carried by the rotatable member in substantially concentric relation to the rotational axis of said member, said annulus comprising a circumferentially extending central portion relatively thick radially and integral relatively thin annular marginal portions, the marginal portions of the annulus each being formed with a circumferentially extending reverse bend, the marginal portions of the annulus also being disposed in spaced substantially parallel relation to one another, and a rigid circular retaining element carried by the rotatable member, said retaining element having a substantially cylindrical surface and circular flanges angularly disposed with respect to the cylindrical surface in the provision of a circumferentially extending concavity in the retaining element, the thick central portion of the deformable annulus being received within the concavity of the retaining element and being normally substantially in contact with the cylindrical surface of such element, and the angularly disposed circular flanges of the retaining element being received within the bends of the relatively thin marginal portions of the annulus.

18. In a torque transmitting device, a rigid member, a resilient deformable annulus having a body portion of greater axial width than radial thickness and circular faces directed radially inwardly and outwardly, said annulus including oppositely directed flanges along the sides of the body portion and integral with the latter, each of said flanges being joined to the body portion of the annulus along a circumferentially extending arcuate line of connection of greater radius than the radius of the inwardly directed face of the annulus body and of less radius than the outer face of the annulus, means gripping the flanges at a radius intermediate the radii of the inwardly and outwardly directed faces of the annulus for securing the flanges of the annulus to the rigid member, and means for introducing a fluid under pressure between the annulus and said rigid member.

19. In a torque transmitting device a member formed with an annular channel, the channel having spaced side walls and a substantially circular bottom face, the side walls of the channel having circumferentially extending arcuate recesses substantially concentric to the bottom face, the recesses being radially spaced from the bottom face of the channel, a resilient deformable annulus confined between the side walls of the channel, said annulus having radially inwardly and outwardly directed surfaces substantially concentric to the bottom face of the channel, one of said surfaces normally being seated against the bottom face of the channel, said annulus having side faces adjacent the side walls of the channel, said annulus having integral sealing flanges along and projecting from its side faces, said sealing flanges being spaced radially outwardly from the inwardly directed surface of the annulus and radially inwardly from the outwardly directed surface of the annulus, and the sealing flanges of the annulus being received in the recesses in the side walls of the channel.

20. In a torque transmitting device, a member formed with an annular channel, the channel having spaced side walls and a substantially circular bottom face, the side walls of the channel having circumferentially extending arcuate recesses substantially concentric to the bottom face, the recesses being radially spaced from the bottom face of the channel, a resilient deformable annulus confined between the side walls of the channel, said annulus having radially inwardly and outwardly directed surfaces substantially concentric to the bottom face of the channel, one of said surfaces normally being seated against the bottom face of the channel, said annulus having side faces adjacent the side walls of the channel, said annulus having integral sealing flanges along and projecting from its side faces, said sealing flanges being spaced radially outwardly from the inwardly directed surface of the annulus and radially inwardly from the outwardly directed surface of the annulus, the sealing flanges of the annulus being received in the recesses in the side walls of the channel, and tensile reinforcing elements embedded in the annulus and the sealing flanges thereof and extending into the side wall recesses, said tensile reinforcing elements being located closer to that surface of the annulus which is normally seated against the bottom face of the channel than to the other surface of the annulus.

21. In a torque transmitting device, a support member having a rigid substantially circular flange, said flange having a free edge, a resilient deformable member carried by said member and comprising a relatively thick body portion and a relatively thin retaining portion, said latter portion embracing the free edge of the flange, reinforcing tensile elements embedded in the deformable member, said tensile elements extending through the thick body portion of the deformable member, into the flange embracing portion and around the free edge of the flange, and rigid means carried by the support member embracing both the relatively thin flange embracing retaining portion of the deformable member and the free edge of the rigid flange and clamping said thin retaining portion of the deformable member and the tensile elements embedded therein against the rigid flange to secure the deformable member against relative rotation on said support member.

22. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder.

23. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder, and tensile reinforcing elements imbedded in the annulus, said tensile reinforcing elements extending uninterruptedly from within one of said attaching flanges, through said body and into the other of said attaching flanges.

24. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder, and tensile reinforcing elements imbedded in the annulus, said tensile reinforcing elements extending uninterruptedly through said body and attaching flanges substantially from the free edge of one of said flanges to the free edge of the other.

25. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder, and a series of generally axially extending reinforcing cords imbedded in the annulus and distributed circumferentially thereof, said reinforcing cords extending uninterruptedly through one of said attaching flanges from adjacent the free edge thereof, through said body, and through the other of said attaching flanges to adjacent the free edge thereof.

26. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder, and a series of generally axially extending reinforcing cords imbedded in the annulus and distributed circumferentially thereof, said reinforcing cords extending uninterruptedly through one of said attaching flanges from adjacent the free edge thereof, through said body and through the other of said attaching flanges to adjacent the free edge thereof, and said cords lying closely adjacent and substantially paralleling the cylindrical surface of said body closest to the zones of connection of said attaching flanges to the body.

27. A resilient deformable annulus for use in a fluid motor, comprising a molded rubber body ring which, in radial cross section, is of greater axial length than radial thickness, the body having substantially cylindrical, substantially concentric, inner and outer surfaces and integral attaching flanges extending circumferentially of the annulus and projecting axially in opposite directions from opposite sides of the body, and having free edges permitting mechanical gripping of the flanges in assembly in a fluid motor, the radial thickness of the annulus changing abruptly at the line of connection between each of the flanges and the body, the connection of each of the flanges to the body being located in a zone between imaginary cylinders containing the inner and outer surfaces of said body, each connection zone being spaced radially from said imaginary cylinders, and the space between each connection zone and one of the imaginary cylinders being greater than the space between each such zone and the other imaginary cylinder, and a series of generally axially extending reinforcing cords imbedded in the annulus and distributed circumferentially thereof, said reinforcing cords extending uninterruptedly through one of said attaching flanges from adjacent the free edge thereof, through said body, and through the other of said attaching flanges to adjacent the free edge thereof, said attaching flanges projecting from said body along reverse bends toward said imaginary cylinder closest to the zones of connection of said attaching flanges to said body, and said cords lying closely adjacent and substantially paralleling the cylindrical surface of said body closest to the zones of connection of said attaching flanges to the body.

HERMAN T. KRAFT.

References Cited in the file of this patent

UNITED STATES PATENTS

| Number | Name | Date |
|---|---|---|
| 2,187,226 | Davis | Jan. 16, 1940 |
| 2,246,979 | Kraft et al. | June 24, 1941 |
| 2,251,444 | Fawick | Aug. 5, 1941 |
| 2,251,445 | Fawick | Aug. 5, 1941 |
| 2,257,610 | Kraft | Sept. 10, 1941 |
| 2,268,509 | Kraft | Dec. 30, 1941 |
| 2,311,113 | Klocke | Feb. 16, 1943 |
| 2,367,048 | Pentz | Jan. 9, 1945 |
| 2,418,099 | Schmitter | Mar. 25, 1947 |
| 2,431,937 | Hunter | Dec. 2, 1947 |
| 2,446,694 | Dickson | Aug. 10, 1948 |
| 2,449,383 | Hunter | Sept. 14, 1948 |